United States Patent [19]

Suzuki

[11] 4,444,431
[45] Apr. 24, 1984

[54] LOCKING MECHANISM FOR VEHICLE SEATS

[75] Inventor: Saburo Suzuki, Anjo, Japan

[73] Assignee: Aisin Seiki Kabushiki Kaisha, Kariya, Japan

[21] Appl. No.: 396,331

[22] Filed: Jul. 8, 1982

[30] Foreign Application Priority Data

Jul. 15, 1981 [JP] Japan .................. 56-110282

[51] Int. Cl.³ .......................... A47C 1/02; B60N 1/02
[52] U.S. Cl. .................................... 297/316; 297/321; 297/379; 297/328
[58] Field of Search ............... 297/297, 319, 321, 320, 297/316, 354, 379, 64, 65, 340

[56] References Cited

U.S. PATENT DOCUMENTS

| | | | |
|---|---|---|---|
| 847,880 | 3/1907 | Barker et al. | 297/319 |
| 2,400,588 | 5/1946 | McArthur | 297/320 |
| 2,622,659 | 12/1952 | Stelmack | 297/64 |
| 2,655,197 | 10/1953 | Schofield | 297/319 |
| 3,680,821 | 8/1972 | Barriere | 297/328 |

FOREIGN PATENT DOCUMENTS

| | | | |
|---|---|---|---|
| 154892 | 1/1953 | Australia | 297/320 |
| 812042 | 5/1969 | Canada | 297/340 |
| 1298008 | 5/1962 | France | 297/297 |
| 637068 | 5/1950 | United Kingdom | 297/320 |

Primary Examiner—William E. Lyddane
Assistant Examiner—Mark W. Binder
Attorney, Agent, or Firm—Oblon, Fisher, Spivak, McClelland & Maier

[57] ABSTRACT

A locking mechanism for a vehicle seat having a seat cushion and a backrest is disclosed. The locking mechanism includes of a bracket fixed to the vehicle floor and provided with an elongated vertical groove. A locking pin fixed to the seat cushion is guided in the elongated groove of the bracket. A first latch is pivotably mounted on the bracket and provided with an engaging groove engageable with the locking pin, as well as a projecting portion and a sliding face. A second latch is pivotably mounted on the bracket and is provided with a recessed portion engageable with the locking pin, as well as a cam surface engageable with the projecting portion of the first latch. The engaging groove of the first latch is urged into engagement with the locking pin by a first spring while the recessed portion of the second latch is urged into engagement with the locking pin by a second spring. A wire is engaged between the backrest and the first latch.

3 Claims, 6 Drawing Figures

LOCKING MECHANISM FOR VEHICLE SEATS

BACKGROUND OF THE INVENTION

1. Field of the Invention

The present invention relates to a locking mechanism, and more particularly to a locking mechanism for vehicle seats.

2. Description of the Prior Art

In a conventional locking mechanism for vehicle seats a linkage mechanism for fully and rearwardly reclining a backrest of a seat is provided. However, in such prior art mechanism, the construction of the locking mechanism was complicated and the operation difficult.

SUMMARY OF THE INVENTION

An object of the present invention is to provide an improved locking mechanism for vehicle seats which obviates the aforementioned drawbacks of the described conventional locking mechanism.

A further object of the present invention is to provide an improved locking mechanism for vehicle seats which can reliably be moved and reclined.

A still further object of this invention is to provide an improved locking mechanism for vehicle seats which is relatively simple and includes a minimum number of parts.

BRIEF DESCRIPTION OF THE DRAWINGS

Various other features, objects and attendant advantages of the present invention will become self evident when considered in connection with the accompanying drawings, wherein.

DETAILED DESCRIPTION OF THE PREFERRED EMBODIMENTS

Figure 1:
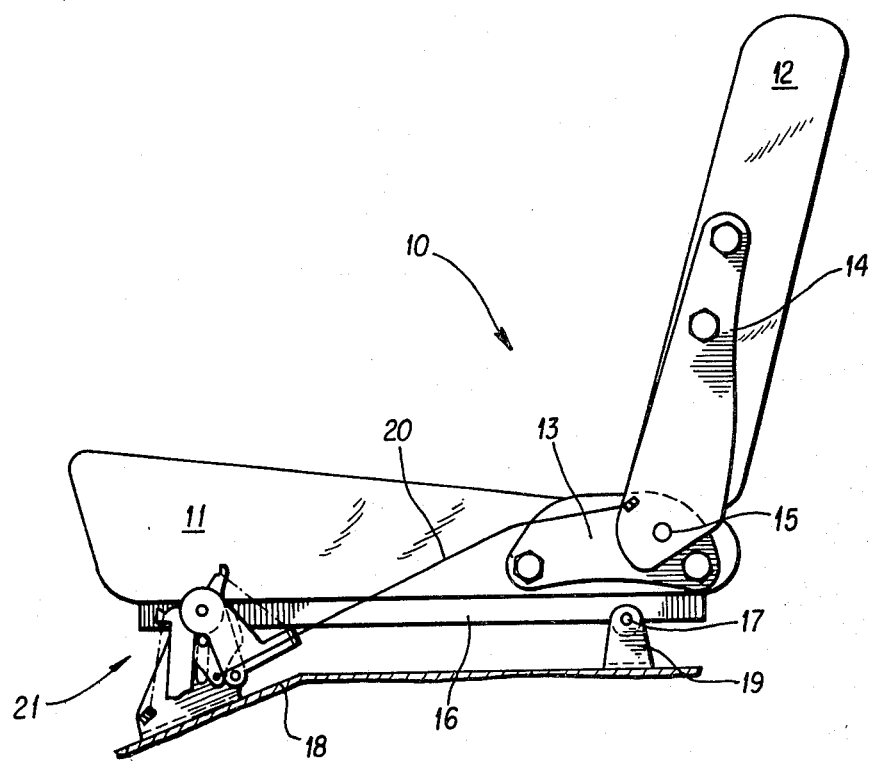
FIG. 1 is a side view which shows a preferred embodiment of a locking mechanism for vehicle seats according to the present invention.
Figure 2:
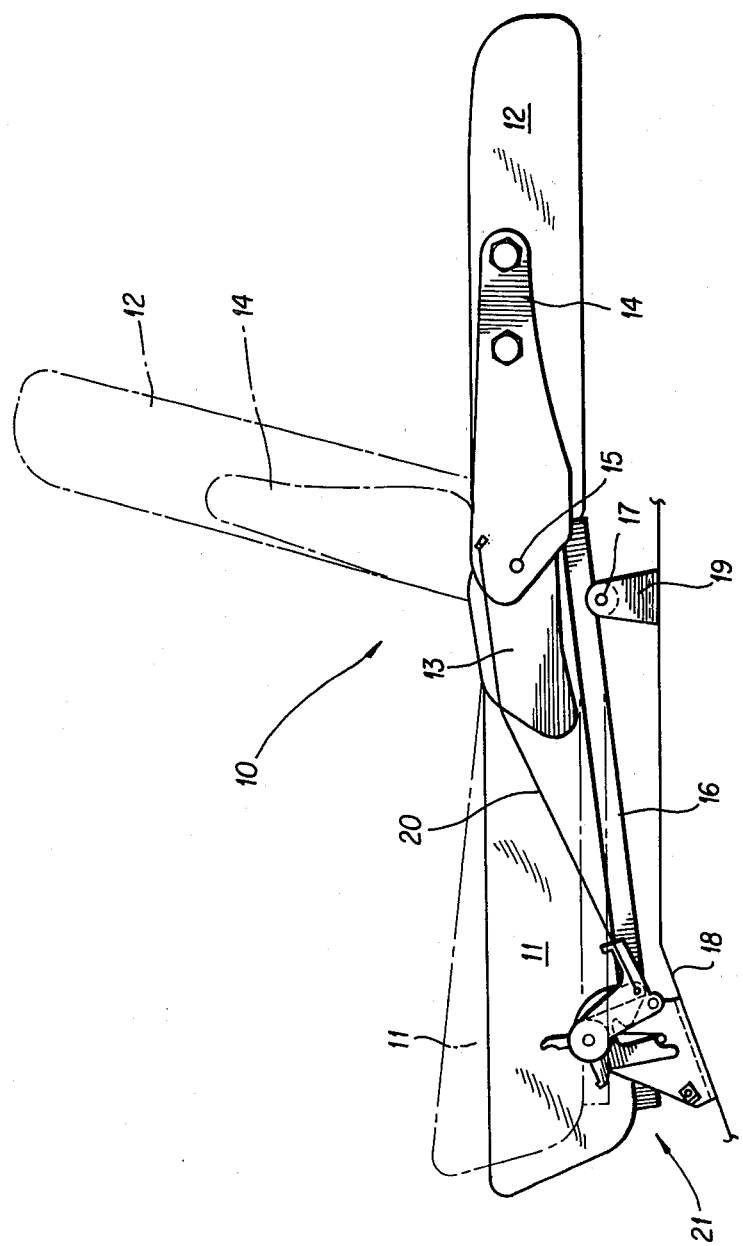
FIG. 2 is a view similar to FIG. 1, however showing the seat in the stage of actuating of the present invention.

Referring now to FIGS. 1 and 2, reference numeral 10 denotes a seat for vehicles which includes a seat cushion 11 and a backrest 12. A seat cushion bracket 13 is fixedly attached to the seat cushion 11 and a backrest bracket 14 is fixedly attached to the backrest 12. The seat cushion bracket 13 and the backrest bracket 14 are pivotably connected by a hinge axle 15 so that the backrest 12 can be forwardly and rearwardly pivoted relative to the seat cushion 11.

A seat frame 16 is fixed to a lower end of the seat cushion 11 and is pivotably supported on a bracket 19 fixed to a vehicle floor 18 through a pin 17. Reference numeral 20 indicates a wire having one end engaged with a lower portion of the backrest bracket 14 and the other end rotatably engaged with a first latch 22 of a locking mechanism 21.

The locking mechanism 21 is constructed as follows.

Figure 3:
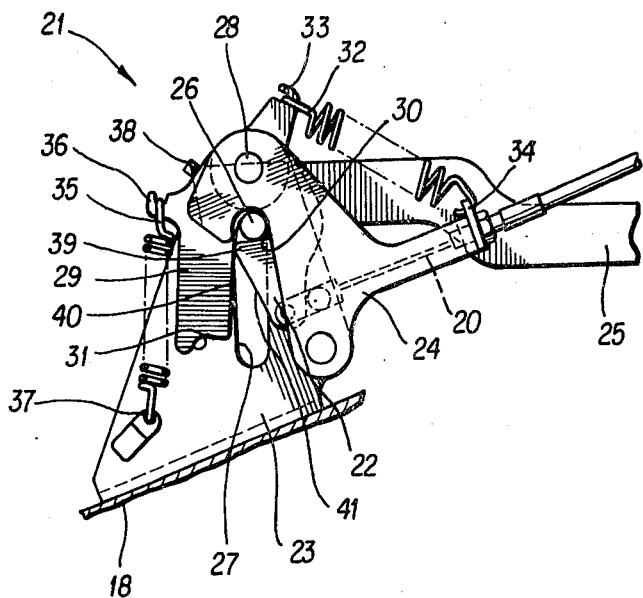
FIGS. 3, 4, 5 and 6 are explanatory views which show the locking mechanism the stages of actuating of the present invention.
Figure 5:
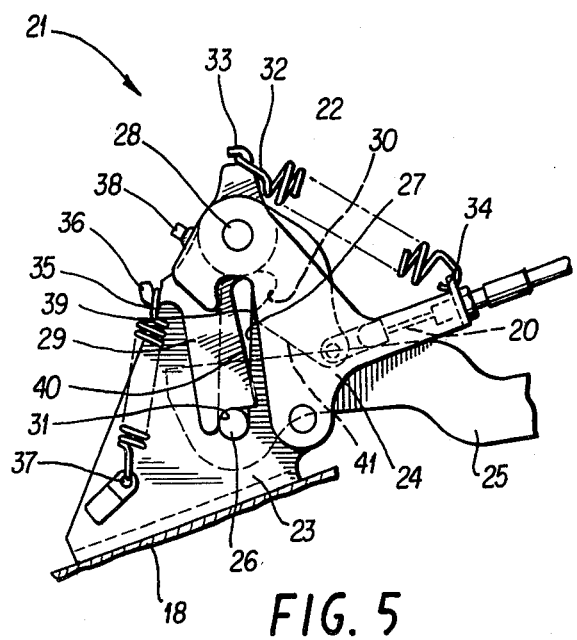

In FIG. 3 reference numeral 23 indicates a bracket fixed to the vehicle floor 18 and a cover plate 24 of the bracket is fixedly attached to the bracket 23. Reference numeral 25 denotes a seat bracket fixed to the seat frame 16 and reference numeral 26 indicates a locking pin mounted on a left end of the seat bracket 25. The locking pin 26 is inserted into an elongated slot 27 of the bracket 23. The first latch 22 and a second latch 29 are pivotably supported on a pin 28 provided on the cover plate 24. The first latch 22 is provided with an engaging groove 30 engageable with the locking pin 26. The second latch 29 is provided with a recessed portion 31 engageable with the locking pin 26 when the locking pin 26 is located at the lowest position of the elongated slot 27 of the bracket 23 (FIG. 5).

Reference numeral 32 indicates a spring having one end engaged with a hooked portion 33 of the first latch 22 and the other end engaged with an engaging portion 34 of the cover plate 24, so that the engaging groove 30 of the first latch 22 is urged by the spring 32 in a direction so as to engage with the locking pin 26. Reference numeral 35 indicates a spring having one end engaged with a hooked portion 36 of the second latch 29 and the other end engaged with an engaging portion 37 of the bracket 23, so that the recessed portion 31 of the second latch 29 is urged by the spring 35 in a direction so as to engage with the locking pin 26. The springs are constructed such that the urging force of the spring 32 of the first latch 22 is stronger than that of the spring 35 of the second latch 29. Reference numeral 38 indicates an engaging piece mounted on the bracket 23 and prevents the second latch 29 from clockwise rotation exceeding a predetermined value in FIG. 3. Reference numeral 39 denotes a projecting portion mounted on the first latch 22 and reference numeral 40 indicates a cam surface formed on the second latch 29. The projecting portion 39 of the first latch 22 is engageable with the cam surface 40 of the second latch 29. Reference numeral 41 indicates a sliding surface formed on the first latch 22.

The operation according to the present invention is as follows.

Figure 4:
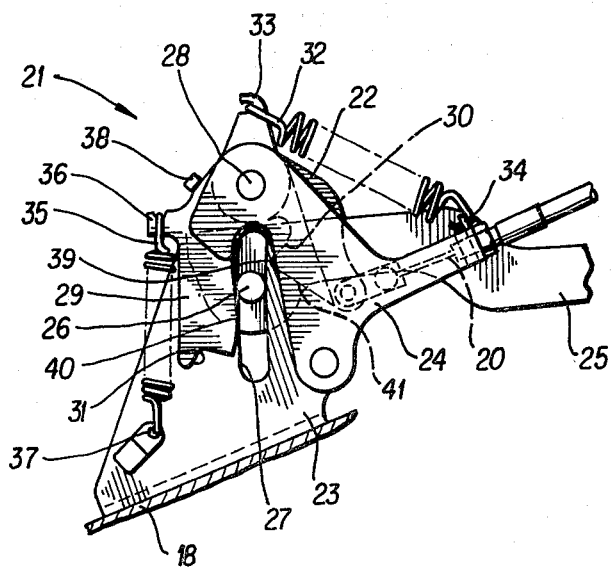

In order to fully and rearwardly recline the backrest 12 of the seat 10, the backrest 12 is allowed to rearwardly pivot around the hinge shaft 15 by releasing a reclining apparatus, not shown. The wire 20 is pulled rightwardly by the rearward inclination of the backrest 12 of the seat in FIG. 1. When the wire 20 is thus pulled rightwardly, the first latch 22 (FIG. 3) is rotated by the wire in the counterclockwise direction around the pin 28 against the urging force of the spring 32. The engaging groove 30 of the first latch 22 releases the locking pin 26 due to the rotation of the first latch 22 and the locking pin 26 is downwardly guided in the elongated groove 27 of the bracket 23, and in camming contact with the cam surface 40, by the weight of the seat 10 itself or the weight of a sitting person, as seen in FIG. 4. Subsequently, a fully and rearwardly reclined position of the backrest 12 of the seat 10 is obtained, as shown in FIG. 2, and at this time the locking pin 26 reaches the lowest position of the elongated groove 27 of the bracket 23, due to the weight of the seat 10 itself or the weight of the sitting person, as seen in FIG. 5. Accordingly, the second latch 29 is rotated in the counterclockwise direction around the pin 28 due to the urging force of the spring 35, and the recessed portion 31 of the second latch 29 is engaged with the locking pin 26 to lock the pin 26 in the lowermost position.

Figure 6:
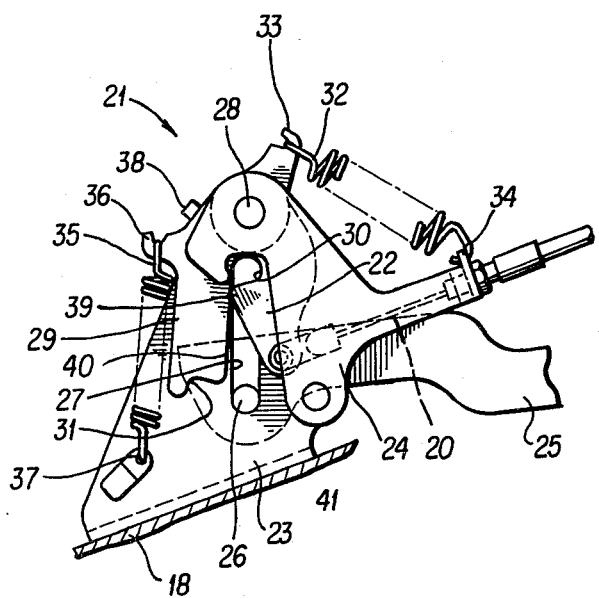

When the backrest 12 returns from the fully and rearwardly reclined position in FIG. 2 to the position of FIG. 1, the wire 20 is moved leftwardly according to the counterclockwise rotation of the backrest 12 of the seat 10 around the hinge shaft 15. As a result, the first latch 22 is rotated in the clockwise direction around the pin 28 due to the urging force of the spring 32. Since the urging force of the spring 32 for the first latch 22 is stronger than that of the spring 35 of the second latch 29, the cam surface 40 of the second latch 29 is pressed by the projecting portion 39 of the first latch 22 and the second latch 29 is rotated clockwise around the pin 28 against the urging force of the spring 35. As a result, the recessed portion 31 of the second latch 29 releases the locking pin 26 (FIG. 6).

In the case where the weight of the sitting person is acting on the rear edge of the seat 10 or the backrest 12, the locking pin 26 is moved upward in the elongated groove 27 of the bracket 23 (FIG. 6) and the first latch 22 is rotated counterclockwise around the pin 28 against the urging force of the spring 32 due to the camming contact between the cam surface 41 of the first latch 22 and the pin 26. Accordingly, the locking pin 26 is locked in the uppermost position of the elongated groove 27 of the bracket due to engagement with the engaging groove 30 of the first latch 22 (FIG. 3).

By the foregoing, there has been disclosed a preferred form of locking mechanism for vehicle seats constructed in accordance with the present invention. It will be appreciated that various additions, substitutions, modifications and omissions may be thereto without departing from the spirit of this invention.

What is claimed as new and desired to be secured by Letters Patent of the United States is:

1. A locking mechanism for a vehicle seat having a seat cushion and a backrest, comprising:
    a bracket fixed to a vehicle floor and provided with an elongated groove;
    a locking pin fixed to said seat cushion and guided in said elongated groove of said bracket;
    first latch means pivotably mounted on said bracket and provided with an engaging groove engageable with said locking pin for retaining said seat cushion in a first position, said first latch means further provided with a projecting portion and a sliding face;
    second latch means for retaining said seat cushion in a second position vertically displaced from said first position, said second latch means pivotably mounted on said bracket and provided with a recessed portion engageable with said locking pin and a cam surface engageable with said projecting portion of said first latch means;
    first spring means for urging said engaging groove of said first latch means into engagement with said locking pin;
    second spring means for urging said recessed portion of said second latch means into engagement with said locking pin; and
    wire means for effecting disengagement of said first and second latch means, said wire means having one end engaged with said backrest and other end engaged with said first latch means, whereby pivotal movement of said backrest in one direction effects disengagement of said first latch means and pivotal movement of said backrest in the opposite direction effects disengagement of said second latch means by engagement of said projecting portion of said first latch means with said cam surface of said second latch means.

2. A locking mechanism for vehicle seats as set forth in claim 1, wherein said first spring means is engaged with said first latch means at one end and at the other end with an element fixed to said bracket, and wherein said second spring means is engaged with said second latch means at one end and with said bracket at other end.

3. A locking mechanism for vehicle seats as set forth in claim 2, wherein the urging force of said first spring means is stronger than that of said second spring means.

* * * * *

UNITED STATES PATENT AND TRADEMARK OFFICE
CERTIFICATE OF CORRECTION

PATENT NO. : 4,444,431
DATED : April 24, 1984
INVENTOR(S) : Saburo Suzuki

It is certified that error appears in the above-identified patent and that said Letters Patent is hereby corrected as shown below:

In the Abstract, Line 3, omit "of";

In Column 1, Line 41, insert "during" before "the".

Signed and Sealed this

Twenty-sixth Day of March 1985

[SEAL]

*Attest:*

DONALD J. QUIGG

*Attesting Officer*     *Acting Commissioner of Patents and Trademarks*